(12) United States Patent
Takeshima et al.

(10) Patent No.: US 6,566,414 B2
(45) Date of Patent: May 20, 2003

(54) CURING METHOD TO CURE EPOXY RESINS IN A SHORT TIME, AND A METHOD FOR ABSORBING ELECTROMAGNETIC WAVE THROUGH CURED EPOXY RESINS OBTAINED BY SAID CURING METHOD

(75) Inventors: Hideo Takeshima, Minato-ku (JP);
Takao Yoshino, Minato-ku (JP);
Hiroshi Nakanishi, Sanda (JP);
Makoto Matsuura, Sanda (JP);
Takashi Shimizu, Sanda (JP)

(73) Assignees: Nippon Liner Co., Ltd., Tokyo (JP);
Tohto Resin Products Co., Ltd., Tokyo (JP)

( * ) Notice: Subject to any disclaimer, the term of this patent is extended or adjusted under 35 U.S.C. 154(b) by 0 days.

(21) Appl. No.: 09/899,126

(22) Filed: Jul. 6, 2001

(65) Prior Publication Data

US 2002/0024170 A1 Feb. 28, 2002

(30) Foreign Application Priority Data

Jul. 11, 2000 (JP) ........................................ 2000-210312

(51) Int. Cl.$^7$ .................................................. C08F 2/46
(52) U.S. Cl. ........................ 522/100; 522/170; 522/176; 522/74; 522/81; 522/83; 204/157.15; 204/157.43; 264/489; 523/300; 526/88; 526/89; 526/90; 526/266
(58) Field of Search ................................. 522/100, 170, 522/176, 74, 81, 83; 204/157.15, 157.43; 264/489; 523/30; 526/88, 89, 90, 266

(56) References Cited

U.S. PATENT DOCUMENTS

| | | | | |
|---|---|---|---|---|
| 4,420,597 A | * | 12/1983 | Gruber | ...................... 526/261 |
| 4,626,642 A | * | 12/1986 | Wang et al. | .............. 156/272.4 |
| 4,878,978 A | * | 11/1989 | Goel et al. | ................ 156/272.4 |
| 5,064,494 A | * | 11/1991 | Duck et al. | ............... 156/273.5 |
| 5,086,149 A | * | 2/1992 | Baron et al. | ................. 156/285 |
| 5,139,826 A | * | 8/1992 | Kuziemka et al. | .......... 427/380 |
| 5,189,078 A | * | 2/1993 | Johnson et al. | ............. 523/137 |
| 5,238,975 A | * | 8/1993 | Johnson et al. | ............. 428/344 |
| 5,272,216 A | * | 12/1993 | Clark et al. | ................... 209/11 |
| 5,317,045 A | | 5/1994 | Clark et al. | |
| 5,334,594 A | * | 8/1994 | Ito et al. | ...................... 514/291 |
| 5,340,649 A | * | 8/1994 | Roeker et al. | ............... 428/344 |
| 5,400,460 A | * | 3/1995 | Roeker et al. | ........... 15/230.12 |
| 5,710,413 A | | 1/1998 | King et al. | |
| 5,712,044 A | * | 1/1998 | Fanselow et al. | ........... 428/510 |
| 5,766,744 A | * | 6/1998 | Fanselow et al. | ........... 428/213 |
| 5,833,795 A | | 11/1998 | Smith et al. | |
| 5,837,088 A | * | 11/1998 | Palmgren et al. | ......... 156/272.2 |
| 6,045,648 A | * | 4/2000 | Palmgren et al. | ......... 156/272.4 |
| 6,056,844 A | * | 5/2000 | Guiles et al. | ............. 156/272.4 |
| 6,312,548 B1 | * | 11/2001 | Fathi et al. | ............... 156/275.1 |
| 6,368,994 B1 | * | 4/2002 | Sklyarevich | ................ 502/202 |
| 6,423,953 B1 | * | 7/2002 | Johnson, Jr. | ................ 219/643 |

FOREIGN PATENT DOCUMENTS

| | | |
|---|---|---|
| EP | 0 403 276 A2 | 12/1990 |
| EP | 0 761 842 A1 | 3/1997 |
| EP | 0 785 557 A1 | 7/1997 |
| EP | 0 884 739 A1 | 12/1998 |

\* cited by examiner

Primary Examiner—James J. Seidleck
Assistant Examiner—Sanza L. McClendon
(74) Attorney, Agent, or Firm—Sherman & Shalloway

(57) ABSTRACT

The present invention is a short time curing method of epoxy resin compositions composed of epoxy resins with more than 1.8 epoxy groups and curing agents which can react with epoxy groups and cure the epoxy resins at ambient temperatures or under the temperature raising conditions radiating microwave in the range of 300 $MH_z$ to 30 $GH_z$ frequency.

14 Claims, No Drawings

CURING METHOD TO CURE EPOXY RESINS IN A SHORT TIME, AND A METHOD FOR ABSORBING ELECTROMAGNETIC WAVE THROUGH CURED EPOXY RESINS OBTAINED BY SAID CURING METHOD

BACKGROUND OF THE INVENTION

1. Field of the Invention

The present invention relates to a method to cure epoxy resins in a short time by means of microwave radiation, and a method for absorbing electromagnetic wave using the cured epoxy resins which are obtained by said curing method.

2. Description of the Prior Art

The curing reactions of epoxy resins can be occur with its required energy such as heating, and propagate exothermically. And when reached to a certain level of curing reaction rate, the cured properties which are practically effective can be obtained. The cured epoxy resins obtained as above are generally in use as coating, adhesive, material for road paving, casting material, molding material, sealant, composite material and laminate, which are useful from the view point of industry. In general, as the heat source that heats material, infra red rays including far infra red rays radiated from hot air, steam, heater or gas burner are used, and the provided heat energy is transferred through complicated effect of radiation, convection and conduction to the surface of the material and is transferred from the surface to its inside.

The heating method to utilize an exothermic phenomenon by high frequency wave radiation is called as the radio frequency heating and in use widely. In case where the material to be heated is a conductor, it can be heated with eddy current which generates inside the conductor when it is set in a coil called induction in which high frequency electric current is streamed and is called induction light. In case where the materials are insulating ones such as plastics and woods, they are set between two electrodes in which high frequency voltage is charged and heated by dielectric loss. Since above-mentioned two cases, the materials can be heated homogeneously by a kind of inductive heat inside them. Therefore, these two types of heating are utilized for the homogeneous drying of woods, adhering and molding of plastics. These methods are called a microwave heating, because these methods use microwave with wave length of 0.1 mm to 1 m such as sub millimeter wave, millimeter one, centimeter one or decimeter wave. As the microwave to be used in this invention, the electromagnetic waves with 1 cm to 1 m wave length are desirably used. The frequency number of said microwave is 300 MHz to 30 GHz. Microwave ovens are a heating system unit to heat insulating materials which the above mentioned principle is applied that utilize above mentioned theory (refer to pages of 489 and 1529, Iwanami Physical and Chemical Dictionary 5th edition, February 98, Iwanami Shoten).

Accordingly, microwave-heating units have been developed vigorously for the purpose of industrial applications. Practical heating units have realized (Papers of 12th Japan Road Conference, Coating Technology. vol 3, 2000; Tsuneo Nakamura). However, actual applications which use the microwave heating and drying method are only for acid curing type, amino alkyd resin base coating paints and polyester-polyurethane type ones in the coating field. Further, in the case of melamine resin type coating, there have been a report that the microwave heating can not be applied, practically because the base resin is partially damaged by the microwave radiation. When the microwave heating is used, good effects are expected in the following. That is, reduction of drying time and the improvement of its operating efficiency could be attained. However, if the materials to make coating are not selected suitably, damage such as foaming observed in the case of melamine resin will occur. Because curing reaction take place quickly. In the case of a clay type material even when water inside the material can be vaporized, a constant rate period of drying cannot be made and directly shifted to a falling rate period. Therefore, transfer rate of vaporized water becomes very slow and pressure inside the coat raises and results in cracking there. Therefore, in this case, many examples that the microwave drying method cannot be substantially used have been known.

Up to this time, as the radio-frequency heating process for epoxy resin compositions, the heating and curing method of fiber reinforced plastics by microwave radiation has been proposed (Japanese Patent Publication 5-79208). This method is specialized as the method to heat and cure a reinforced plastic by microwave radiation and, characterized by settling a molded product of fiber reinforced plastics into a mold made of a material with exothermic reaction by microwave radiation and includes microwave radiation to said molded product and the mold to cause a curing reaction of the molded product and the mold with heat generation. And for Kebler fiber reinforced epoxy resin type prepreg is mentioned as typical example for the fiber reinforced plastics. Further, as the said method to cure a resin molded product, the method to contain molding material composed mainly of a uncured thermosetting resin in a mold which easily conducts electromagnetic wave, and radiate electromagnetic wave from the outside of the mold so as to heat the mold and the above resin at one time is proposed (Japanese Patent Laid open Publication 11-300766). As the thermosetting resin, a modified epoxy resin which has a polar group, a modified epoxy resin obtained by the reaction between carboxyl group containing fatty acid modified urethane compound and epoxy resin and the mixture of said modified epoxy resins and glycidyl ether resins are described as example. Further, as another method, post curing (post curing method) characterized by microwave heating to heat thermosetting resin molded products and post cure them has been disclosed (Japanese Patent Laid-Open publication 9-109271).

These mentioned examples have no intention and are not any method to cure an epoxy resin composition by direct microwave radiation in it, but a method to use heat induced by microwave radiation to a mold as heat to cure the resin are limited to a case that the epoxy resin itself is a very special resin, or a method of post curing after almost completion of the curing.

Epoxy resins are very useful as coating to coat a structural materials, anti-corrosive coating for concretes, repairing materials for concretes, materials for road paving, epoxy asphalt materials and insulators for electric and (or) electronic parts, because of their excellent features such as adhesivity, anti-corrosivity, anti-chemical properties, insulating and mechanical properties. The hardening mechanism of epoxy resins used for above-mentioned applications is illustrated as follows. That is, epoxy resins of lower molecule weight and curing agent are initiated to heating at ambient temperatures or under the temperature raising condition and form cross linked structures so as to form a cross linked and cured coating film of polymer. In general, to progress this curing reaction, it is necessary to heat epoxy resin compositions at temperatures higher than 200° C. for 10 to 30 minutes or eventually several hours. For the realization of this curing process, a large scale drying furnace and wide plant site are required to install it. Therefore, the corresponding the total plant cost is very expensive and is not to be practical when it will be set temporally in a construction field. In the meanwhile, in case of ambient temperature curing method, epoxy resin and curing agent can be prepared separately and respectively mixed at the practical use point. In this case, if a type of short time curing agent is used, the available time of the cured product is remarkably shortened, and subsequently the blending volume of epoxy resin and curing agent is limited to incur a problem that the processing characteristics efficiency decrease remarkably. And, when the curing time is adjusted to be longer, the time to give the initial practical strength to the cured product is delayed, and the problem that the road opening time after road repairing is delayed increasingly might occur. Further more, to avoid the troublesome due to mixing of two liquids at the actual construction point, one liquid type formulation is strongly desired. Additionally, from the viewpoint of global environment, an curing system and does not give any pollution and noise to us which does not generate $CO_2$, SOx or NOx at the construction point has been desiring to realize.

BRIEF SUMMARY OF THE INVENTION

The inventors of the present invention have conduced every study to solve the above-mentioned problems, and have accomplished a short time curing method for epoxy resins by direct radiation of microwave to non-pollution and non-solvent type epoxy resin compositions. That is, the object of the present invention is to solve the above-mentioned problems and to provide an improved method of the short time curing for epoxy resins. Said method can be realized by no use of conventional heating methods such as radiation, convection and conduction using infrared rays including far infra red rays radiated from hot air, steam, heater or gas burner. Namely, the present invention enables us to make curing time of one liquid type formulation short with no using non-solvent type epoxy resin composition and microwave radiation. Furthermore, even if a two liquid type epoxy resins composition or the epoxy resin composition whose curing time is adjusted to be longer, the curing time can be shortened by use of microwave radiation. Therefore, this invention shows that a time to open the road for use after road repairing procedure can be shortened and traffic jam during the road repairing can be alleviated. The present invention is especially useful for the method of road pavement and more especially useful in case where field works needs. Moreover, this invention is useful in case of curing a molded product of epoxy resin composition in a shorter time at factory side.

That is, the important point of this invention is that a short time curing method of epoxy resin compositions composed of an epoxy resin with more than 1.8 epoxy groups and a curing agent which can reacts with epoxy groups and cure the epoxy resin at ambient temperatures or at under the temperature raising conditions radiating microwave in frequency range of 300 $MH_z$ to 30 $GH_z$.

Furthermore, in case where said epoxy resin compositions are slowly curable, it is possible to shorten the curing time by blending voluntarily an exothermic type accelerator by microwave radiation to them. In the present invention, it is effective to be one liquid type formulations with no any solvent or powder compositions; however, two liquid type compositions are also applicable. Furthermore, the present invention includes the method to irradiate microwave directly to the surface of epoxy resin compositions under the condition that said epoxy resin compositions are a unified in body with a mold substrate, namely, their curing is accelerated by a kind of inductive heating of the mold substrate by microwave which passes through the epoxy resin compositions. Moreover, another important point of this invention is that the cured product, which can be cured under the existence of a microwave exothermic type accelerator, has a feature to absorb electromagnetic wave. This is an unexpected excellent effect based on this invention, and this fact indicates that the cured product has a possibility to be used as electromagnetic wave absorber. Especially, in case where ferrites are used as microwave exothermic accelerator, they acts as microwave exothermic accelerator in the curing process, and after curing epoxy resin compositions they remains in the cured product and acts as electromagnetic wave absorber. Therefore, it can be used as reflector absorber for VHF wave or UHF wave on and inside the wall of electric wave darkroom or to the wall of office building, and also it can be used for measures to prevent a kind of forgery radar or to prevent electromagnetic wave from leaking. Further, at tollgates of highway with which an Electronic Toll Collection System is equipped, vehicles can pass through them without stop for payment. In this case, wireless communication using electromagnetic wave is connected normally between antenna set up at the roadside and equipment loaded on vehicles. As the main cause to decrease in the reliability for the wireless communication, the reflected electric wave from the road exists near said toll collection system can be mentioned. This means that the atmospheric environment around the above toll collection system should be prevented from interfering electric wave by absorbing it. The epoxy resins of the present invention is a type which is mold curable, and can be used as electric wave absorber attached to the materials of roads and (or) or constructions near the above mentioned toll collection.

DETAILED DESCRIPTION OF THE INVENTION

The present invention will be explained in detail as follows:

As the microwave to be used for the inductive heating based on the present invention, it in the range of 300 MHz to 30 GHz frequencies is used. The frequency must be selected suitably in accordance with the shape, thickness and kinds of substrate materials, and in general, the microwave of frequency range from 1 GHz to 10 GHz can be in use. As heating unit to radiate said microwave, the unit which consists of following part with units is used, that is, ① a microwave generator which generates microwave desired frequency, ② an isolator which protects the generator from the reflected electric power, a power monitor which monitors inlet and reflected electric powers, ③ a rectifier which meets power load to the generator and utilizes generated microwave, ④ a connection waveguide which transfers microwave from the generator to the radiated parts and ⑤ a microwave heating unit which consists of microwave radiation part. Various kinds of microwave radiation units have been developed depending on to materials and shape of parts to be heated, and for example, batch wise type ovens, conveyer type ovens and transferring type ovens can be mentioned and the desirable oven of them selected to use it. When generated microwave can be radiated uniformly to the surface of molded product to be heated selection of the microwave unit is not affected by the shape of molded product to be heated. And regarding to the generation power of microwave, it is possible to select the desired unit from the ones, which have a broad range from 0.5 KW to 20 KW.

Epoxy resin compositions used in the present invention are the epoxy resin compositions composed of epoxy resins with more than 1.8 epoxy group as main component and curing agents which can react with epoxy groups at ambient temperatures or under the temperature raising conditions, fillers, pigments for coloring, diluting agents, thixotropic agents, flexibilizing agents and other additives if required. However, from the view point of safety of working place and its atmosphere, use of metallic powder which might cause electric discharge phenomenon due to microwave radiation or use of materials which contain a lot of easily volatizable solvent should be avoided. From the current consideration of environmental protection, the improvement of curing method of epoxy resin compositions has been strongly required. That is, curing method with no noise and not to generate chemical substances such as $CO_2$, SOx or NOx, which have been considered to affect negatively the global environment. Additionally, as the improvement of working circumstance is also an important issuer, it is more desirable in the present invention, that said epoxy resin compositions are non-solvent and one liquid type of formulations or powder type compositions for this invention. However, the present invention does not have any problem even if any liquid type formulations would be used.

Another feature of the present invention is that, when said epoxy resin composition itself is slowly curable, it is possible to shorten its curing time when a microwave exothermic accelerator will be formulated properly to the composition. In a case of curing a epoxy resin composition, a curing agent and its blending ratio to the epoxy resin are selected properly to give the desired physical and chemical properties to the cured product, and a wide range of curing conditions of ambient to higher temperature curing is scheduled, and it is general that a long term curing is made as the first step and then a post curing carried out as the second step absolutely to give practical properties to the cured product. It is usual that the attempts such as high temperature heating, use of catalyst to promote epoxy curing reaction until curing temperature is over its activated temperature or use microcupsuled curing agent have been made in order to realize, however, the these attempts are limited to their application. Microwave exothermic accelerators to be formulated for the present invention are not a promoter to activate chemical reactions but the agent to heat uniformly the epoxy compositions containing said exothermic accelerator inside them with the exothermic generator induced by microwave radiation. The exothermic effect of these exothermic accelerators is defined by the concept of depth to attenuate half as high as its original electric power, and it indicated the smaller value of the thickness, the better effect. The exothermic capacity for each of accelerators is larger than induction heating ability of epoxy resin compositions to which microwave is radiated. Therefore, when one of said microwave exothermic accelerator is formulated appropriately to the compositions. The heats formed inside the above epoxy compositions promote their heating rate and enable to reduce time to raise temperature the above compositions to the scheduled one. As especially useful microwave exothermic accelerators, ferrites and water can be mentioned. Ferrites are crystalline represented in the general formula of $MOFe_2O_3$. As M, Mn (manganese), Co (cobalt), Ni (nickel), Zn (zinc) and Ba (barium) can be mentioned, and crystalline substances containing ferrous type ferrite are magnetite. The crystal structure of ferrites is a spinel. The structural state that has site A and site B site and whole part of site A and half part of site B are occupied with $Fe^{3+}$ ions is called reverse spinel structure and subsequently Ferrite magnetism. As it is general, that ferrite's electric resistance is high, it is in use as magnetic core material (refer to pages from 1155 to 1156 of Iwanami appears in this state Physical and Chemical Dictionary 5th edition, February 98).

The ferrites to be used in the present invention are substances represented in above mentioned general molecule formula, especially the ferrites having electric resistance within the range from $10^2$ to $10^6$ $\Omega$cm are preferably used. However, not restricted to them, and any kind of substances which have the same level of inductive heating capability as to ferrite's one through microwave radiation and have good compatibility with substances to be heated can be used.

The present invention includes the method to radiate microwave to said epoxy resin compositions in the form whose said compositions are unified in their substrate and also the method to accelerate the curing of said epoxy resin compositions by inductive heating said substrate through the said epoxy resin composition. As typical examples of said substrates for the above aim, asphalt, concretes, slates, veneer boards, woods, card boards, plastics and metals can be mentioned.

As the epoxy resins which can be used in the present invention, any kind of epoxy resins that have more than 1.8 epoxy groups in one molecule and is liquid at ambient temperatures can be used. As illustrative examples of such kind of epoxy resins, following examples can be mentioned;
bisphenol A type epoxy resins,
bisphenol F type epoxy resins,
bisphenol S type epoxy resins,
phenol novolac type epoxy resins,
alicyclic epoxy resins,
heterocyclic epoxy resins,
glycidyl ester type epoxy resins,
glycidel amine type epoxy resins,
bromine containing epoxy resins,
hydrogenated bisphenol A type epoxy resins,
aliphatic epoxy resins such as propyleneglycolglycidylethers or
urethane denatured epoxy resins
can be mentioned.

These epoxy resins can be used alone or together with each other. And if required, mono- and di-epoxy substances such as butylglycidylethers, phenylglycidylethers, cresylglycidylether or glycidylethers of aliphatic alcohols can be blended, and also, suitable of epoxy resins which is solid at ambient temperatures can be blended.

Among the epoxy resin compositions used in this invention, regarding the compositions prepared by blending an ambient temperature (15 to 40° C.) curing type epoxy resin curing agent to said epoxy resins, the curing agent is an agent Which can cure epoxy resins at ambient temperatures. And, in general, said epoxy resin curing agent has the pot life of 10 minutes to several hours, and it rid actually requires curing time from 10 minutes to about 10 days. For example, substances such as, ethylenediamines, diethylenetriamines, triethylenetetramines, tetraethylenepentamines, hexamethylendiamines, polyoxypropylenediamines or imino bis hexylamines can be mentioned. As alicyclic polyamines, alicyclic compounds with at least 2 amino and/or 2 imino groups which have an activated hydrogen atom which can react with epoxy groups at ambient temperatures in one molecule can be used, and as typical examples,
bis(amino)cyclohexane, N-aminoethylpiperazine,
3,9,-bis(3-aminopropyl)2,4,8,10-tetraoxapiro(5,5)undecan,
m-xylenediamin,
m-hydrogenated xylenediamine,
N-aminoethylpiperazine,
bis(4-aminocyclohexyl)methane and ect.
can be mentioned, and as the derivatives of these chemical compounds, for example;
ethyleneoxide adducts and epoxy resin ones of aliphatic polyamines,
modified aliphatic polyamines of polyethylene polyamine modified products,
hetorocyclic diamine modified products,
mono-glycidylether adducts, epoxy resin ones and acrylonitrile ones of alicyclic polyamines,
modified alicyclic polyamines of fatty acid glycidylester adducts,
polyamideamines which are polycondensed products of polyethylenepolyamine/fatty acid, polyethylenepolyamine/dimer acid and xylylenediamine/dimer acid and their modified products can be mentioned, however, not limited to these amines. These curing agents can be used alone or as mixture of more than two different kinds of the above amines.

As one liquid type epoxy resin compositions, the liquid type epoxy resin compositions in which accelerators such as polyphenols, acid anhydrides, high melting point active hydrogen compounds or tertiary amines, imidazoles and both salts of their salts are used together in the form of dispers ion or solution in liquid epoxy resins can be mentioned. As polyphenols, any kind of novolac phenols and BPA adducts of BPA epoxy resins at both ends of them which have more than 2 phenolic hydroxyl groups in one can be mentioned. As acid anhydrides, any kinds of compounds that have over one acid anhydride group such as phthalic acid anhydride or methylhexahydro phthalic anhydride can be used. As typical example of high melting point active hydrogen chemical compounds, dicyano diamido or organic acid hydrazide can be mentioned, and said compounds can be used as curing agent because they can add to epoxy groups to cure. Curing agents which have been blended in the above liquid epoxy resin can be mentioned. Namely, said curing agents are a high melting point dispersion or melt types of salts of tertiary amines or imidazoles which have a function of self polymerization ion of epoxy resin with an anionic mechanism accompanied melting decomposing and subsequently activating said salts by heating. Furthermore, the liquid epoxy resin compositions in which curing agents such as Lewis acids and Brønsted acids have been already blended can be mentioned, said curing agent have a cation mechanism to activate themselves and polymerize epoxy resins by heating. This type of polymerization initiators is called cationic polymerization type initiator, any kind of initiators which has cationic polymerizing mechanism can be used, and preferably Sanado SI (product of Sanshin Chemicals Industries Co., Ltd. Tokyo, Japan) or Adekaopton CP series CP66, CP-77 (product of Asahi Denka Industries Co., Ltd. Tokyo, Japan) can be mentioned, however not intending to be limited to them. Further, latent curing agents and latent accelerators, which are available in the market, can be used together with said cationic polymerization iniciator, and as examples; aminadducts such as amicure PN-23, MY-24, microcapsule latent type curing agents initiators Novacures (products of Asahi Chemical Epoxy Co., Ltd. Tokyo, Japan), adduct latent type epoxy curing agents Curadducts (products of Shikoku Kasei Industries Co., Ltd. Tokyo, Japan), Fujicure-FXR-1013, 1000 (products of Fuji Kasei Industries Co., Ltd. Tokyo, Japan), alkyl urea type epoxy resin cure accelerators 3-(3,4-dichlorophenyl)-1,1-dimetylurea, N-(4-chlorophenyl)-N,N-dimethylurea, phenyldimethylurea, toluenebisdimethylurea (products of A.C.I. Japan Limited. Tokyo, Japan) can be mentioned, however not intending to be limited to them. It is effective to blend said exothermic accelerators of this invention voluntarily in the above-mentioned iniciators if needed.

As one liquid type epoxy resin powder compositions, well-known epoxy resins and curing agents which are used for epoxy powder coating can be used. And as curing agents, acid anhydrides, amines, polyamide resins, dicyandiamides, phenolic type curing agents, phenol novolac resins, ortho cresol novolac resins, polyester resins with end carboxyl group, dihydrazides, imidasols or amine complex of boron trifluiride can be mentioned, and above mentioned various kinds of solid epoxy resins are used. That is, these epoxy resins, curing agents, exothermic accelerators of this invention, said accelerator or other materials are pre-mixed at need and then melted, kneaded through an extruder, cooled down and crushed. Finally powders are obtained by a classifier. Thus, the one liquid type epoxy resin compositions can be obtained.

The epoxy resin compositions for the present invention use said epoxy resins and curing agents as necessary components, and exothermic accelerator, curing accelerators, further, plasticisers, various kinds of additives, coupling agents and coloring agents such as dyes can be blended within the limit, not to kill the heating system microwave radiation, which is the object of this invention.

EXAMPLE

The present invention will be illustrated by concretely through the following Examples, however not intended to be limited to them.

Examples 1 to 15 and Comparative Example 1

To the epoxy resin powder coating A composed of BPA type solid epoxy resin whose epoxy equivalent is 900 g/eq and imidasol curing agent, wherein said epoxy resin powder coating A shall be cured in a hot air circulating type of dryer of 140° C. for 10 minutes, microwave absorbing material was blended by blending ratio described in Table.1, and 6 specimens of powder coating were prepared.

After 1 g of each prepared coating specimen is coated to a mold, the mold is removed and is supported and set to the space far from 7 cm height from a turning glass table inside a microwave oven. Microwave is radiated to each specimen according to the scheduled operation time of the microwave oven with its frequency of 2450 MHz shown in Table.1. Immediately after the radiation, each of radiated specimens is taken out from the microwave oven and cooled down to the room temperatures. Uniformed cured coated films were obtained, and the same procedure as the above was repeated to obtain cured film of 5 g coat. The obtained cured film was pulverized to fine powders through a pulverizer, and then weighted accurately and extracted with acetone by a Soxhlet extractor for 24 hours. Thus, the gel fraction of coated film was calculated, and then the cured rate was calculated. As the microwave oven, ES-HA195/HA196, which is a product of ZOJIRUSHI Co., Ltd.(Tokyo, Japan)was used. As ferrite, ferrite powder prepared in accordance with the following process was used. That is, the mixture of $Fe_2O_3$, NiO, ZnO, Cuo, MnO MgO and BaO is prepared the obtained mixture is calcined and pulverized.

Examples 6 to 10, and Comparative Example 2

To a one liquid type liquid epoxy resin coating B whose viscosity is 10000 mPa·s composed of BPA type liquid epoxy resin and Fujicure FXR-1030 curing agent and also can be gelated in a hot air circulating type of dryer within 10 minutes, microwave absorbing material was added according to the blending ratio shown in Table.2 and 6 specimens of powder coating ware prepared. In the same process as the one in Example 1, the specimens ware radiated inside the microwave oven with frequency of 2450 MHz-), and then the gel fraction of cured film of coat was calculated and the curing rate for each of cured films can be obtained as shown in Table.2.

Examples 11 to 15, and Comparative Example 3

To the epoxy type resin C for skidproof paving on the road having mixture viscosity of 1800 mPa·s, composed of two liquid system of coating with ambient temperature curing whose blending ratio of epoxy resin to curing agent is equal part of weight to be 100 and can be cured at 20° C. for 1 hour and 15 minutes, the same ferrite as the one in Example 1 was added according to the blending ratio shown in Table.3 and 6 specimens of powder coating ware prepared. By the same process to Example 1, the specimens ware radiated inside the microwave oven with frequency of 2450 MHz, and then the gel fraction of cured coating film of the each coat was calculated and the curing rate for each of the cured films obtained as indicated in Table.3.

TABLE 1

Curing rate of cured films from low temperature curing powder coating A (gel fraction) unit (%)

|  | example 1 | example 2 | example 3 | example 4 | example 5 | comparative example 1 |
|---|---|---|---|---|---|---|
| micro wave radiation | 1 min. | 2 min. | 5 min. | 7 min. | 10 min. | |
| hot air dryer 140° C. | | | | | | 10 min. |
| ✕: 0 wt. % | not flowable | not flowable | 39 | 50 | 80 | 99 |
| 10 wt. % | not flow | 46 | 56 | 85 | 98 | |
| 20 wt. % | 29 | 63 | 96 | | | |
| 30 wt. % | 45 | 95 | | | | |
| 50 wt. % | 95 | | | | | |
| 90 wt. % | cracked | | | | | |

✕: ferrite blending rate

TABLE 2

Curing rate of cured film from one liquid system type of coat:B (gel fraction) unit (%)

|  | example 6 | example 7 | example 8 | example 9 | example 10 | comparative example 2 |
|---|---|---|---|---|---|---|
| micro wave irradiation | 1 min. | 2 min. | 5 min | 7 min. | 10 min. | |
| hot air dryer 100° C. | | | | | | 10 min. |
| ✕: 0 wt. % | flow | not flow | 83 | 90 | 93 | 85 |
| 10 wt. % | | | 85 | 92 | 99 | |
| 20 wt. % | | 76 | 97 | | | |
| 30 wt. % | 50 | 96 | | | | |
| 40 wt. % | 60 | | | | | |
| 50 wt. % | 95 | | | | | |

✕: ferrite blending rate

TABLE 3

Curing rate of cured film from two liquids system resin C for skidproof paving (gel fraction) unit (%)

|  | example 11 | example 12 | example 13 | example 14 | example 15 | comparative example 3 |
|---|---|---|---|---|---|---|
| micro wave irradiation | 1 min. | 2 min. | 5 min. | 7 min. | 10 min. | |
| 20° C. incuvator | | | | | | 75 min. |
| ✕: 0 wt. % | flow | 77 | 83 | 87 | 93 | 83 |
| 10 wt. % | | 78 | 95 | | | |
| 20 wt. % | 61 | 92 | | | | |
| 30 wt. % | 75 | | | | | |
| 40 wt. % | 85 | | | | | |

✕: ferrite blending rate

The curing rate of a cured film is assumed to be the gel fraction measured by the method mentioned below:

The cured films of coat obtained in each Example and Comparative Examples are crushed coarsely and then pulverized to be smaller than 3 mm using a pulverizer. Take approximately 5 g of obtained powder and weighted accurately with the fourth dicimal place. The weighed powder is transferred to a filterable cylinder a filtering for Soxhley extractor. The cylinder is set to the Soxhlet extractor, and a vacant flask of the Soxhlet extractor is previously weighted accurately and 120 ml of acetone is poured into the flask. Acetone is refluxed continuously for 24 hours to extract uncured resin. After the extraction acetone is recovered to the flask and is dried at 150° C. for 1 hour. The extracted resin in the flask is weighted accurately and finally the unextracted rate is calculated in the form of % (wt).

5 mm thick cured products are prepared based on ferrite blending rates in Examples 3, 8 and 12. Paving materials whose basic structure consists of a functional layer A (said cured product) a functional layer B (iron plate or conductive film) whose the function is a layer for electric magnetic wave and lined to the bottom side of the layer A are prepared and the absorbance of electric magnetic waves are measured by an Arch method. The results showed that the cured product containing 20 wt % of ferrite has a great absorbance of electric magnetic wave at 5 GHz (5000 MHz). This indicates that the product can be designed for electric magnetic wave absorbing material for paving on the road in the electronic toll collection system.

Effect of the Invention

As mentioned above, the present invention is a method to cure the epoxy resin composition in a short time by microwave radiation to it, and the obtained cured product can be used as electric magnetic wave absorbing material.

What is claimed is:

1. A short time curing method for epoxy resin compositions comprising epoxy resins with more than 1.8 epoxy groups and a ferrite as an exothermic accelerator and a curing agent, the method comprising exposing said epoxy resin compositions at ambient temperature to direct microwave radiation in a frequency range of from 1 GHz to 10 GHz.

2. The short time curing method of claim 1, wherein the epoxy resin composition is a non-solvent, one liquid resin composition.

3. The short time curing method of claim 1, wherein the epoxy resin composition is a powder resin composition.

4. The short time curing method of claim 1 further comprising blending 0.1 to 98 weight % of said ferrite as an exothermic accelerator with said epoxy resin composition prior to exposure to said microwave radiation.

5. The short time curing method of claim 4, wherein the epoxy resin composition is a non-solvent, one liquid resin composition.

6. The short time curing method of claim 4, wherein the epoxy resin composition is a powder resin composition.

7. The short time curing method of claim 1 comprising applying said epoxy composition to a substrate and exposing said epoxy resin composition to direct microwave radiation whereby said epoxy resin is cured and unified to said substrate.

8. The short time curing method of claim 7, further comprising blending 0.1 to 98 wt % of said ferrite as an exothermic accelerator with said epoxy resin prior to application to said substrate.

9. A method for absorbing micro magnetic wave energy comprising interposing an epoxy resin product produced according to the method of claim 1 into the path of said energy.

10. The method of claim 9, wherein said epoxy resin produce comprises an epoxy resin with more than 1.8 epoxy groups, a curing agent and an exothermic accelerator.

11. The method of claim 10, wherein said exothermic accelerator is a ferrite.

12. The method of claim 11 wherein said epoxy resin product is produced as a coating on a substrate.

13. A short time curing method for epoxy resin compositions comprising epoxy resins with more than 1.8 epoxy groups and a curing agent, the method comprising exposing said epoxy resin compositions at ambient temperature to direct microwave radiation in a frequency range of from 300 MHz to 30 GHz, wherein the epoxy resin composition is a powder resin composition.

14. A short time curing method for epoxy resin compositions comprising epoxy resins with more than 1.8 epoxy groups and a curing agent, the method comprising exposing said epoxy resin compositions at ambient temperature to direct microwave radiation in a frequency range of from 300 MHz to 30 GHz, blending 0.1 to 98 weight % of an exothermic accelerator with said epoxy resin composition prior to exposure to said microwave radiation, wherein the epoxy resin composition is a powder resin composition.

* * * * *